(12) United States Patent
Jamaly

(10) Patent No.: US 11,233,339 B2
(45) Date of Patent: Jan. 25, 2022

(54) METHODS AND SYSTEMS FOR IMPLEMENTING AND OPERATING MULTIPLE-INPUT AND MULTIPLE-OUTPUT (MIMO) ANTENNAS

(71) Applicant: Swisscom AG, Bern (CH)

(72) Inventor: Nima Jamaly, Bern (CH)

(73) Assignee: SWISSCOM AG

( * ) Notice: Subject to any disclaimer, the term of this patent is extended or adjusted under 35 U.S.C. 154(b) by 48 days.

(21) Appl. No.: 16/578,208

(22) Filed: Sep. 20, 2019

(65) Prior Publication Data

US 2020/0153121 A1    May 14, 2020

(30) Foreign Application Priority Data

Sep. 20, 2018    (GB) ...................................... 1815362
Aug. 1, 2019    (GB) ...................................... 1911016

(51) Int. Cl.
*H01Q 21/24*    (2006.01)
*H01Q 9/04*    (2006.01)

(52) U.S. Cl.
CPC ......... *H01Q 21/245* (2013.01); *H01Q 9/0464* (2013.01)

(58) Field of Classification Search
CPC ...... H01Q 21/245; H01Q 9/0464; H01Q 1/52; H01Q 7/00; H01Q 25/001; H01Q 1/38; H01Q 1/50; H01Q 5/25; H01Q 15/24; H04B 1/0053; H04B 7/0413
See application file for complete search history.

(56) References Cited

U.S. PATENT DOCUMENTS

| | | | |
|---|---|---|---|
| 5,489,913 A | 2/1996 | Raguenet et al. | |
| 10,297,918 B2 * | 5/2019 | Zhang | H01Q 9/0464 |
| 2004/0051675 A1 * | 3/2004 | Inoue | H01Q 5/40 343/728 |
| 2004/0135726 A1 | 7/2004 | Shamir et al. | |
| 2007/0052587 A1 * | 3/2007 | Cheng | H01Q 9/0457 343/700 MS |
| 2007/0164868 A1 * | 7/2007 | Deavours | H01Q 9/0442 340/572.7 |
| 2008/0018867 A1 * | 1/2008 | Fujiwara | G03F 7/70975 355/30 |
| 2008/0048867 A1 | 2/2008 | Oliver et al. | |
| 2008/0136720 A1 * | 6/2008 | Parsche | H01Q 21/24 343/741 |
| 2009/0256653 A1 | 10/2009 | Hung et al. | |

(Continued)

FOREIGN PATENT DOCUMENTS

JP    2014078772 A    5/2014

OTHER PUBLICATIONS

"Design of a Low Profile Unidirectional UWB Antenna for Multi-Service Base Station", Carlos Ramiro Penafiel-Ojeda, et al., 11th European Conference on Antennas and Propogation (EUCAP), 2017, pp. 3575-3579.

(Continued)

*Primary Examiner* — Lam T Mai
(74) *Attorney, Agent, or Firm* — McAndrews, Held & Malloy, Ltd.

(57) ABSTRACT

Methods and systems for implementing and operating antennas, particularly multiple-input and multiple-output (MIMO) antennas, for radio telecommunications.

20 Claims, 9 Drawing Sheets

(56) References Cited

U.S. PATENT DOCUMENTS

| | | | | |
|---|---|---|---|---|
| 2010/0164804 A1* | 7/2010 | Xu | ................ | H04B 7/0617 |
| | | | | 342/372 |
| 2011/0102269 A1* | 5/2011 | Sato | ................ | H01Q 9/0442 |
| | | | | 343/700 MS |
| 2013/0242711 A1* | 9/2013 | Fujisawa | ................ | G04R 60/12 |
| | | | | 368/47 |
| 2014/0240181 A1* | 8/2014 | Mamuro | ................ | H01Q 9/42 |
| | | | | 343/702 |
| 2015/0035704 A1* | 2/2015 | Schwengler | ................ | H01Q 1/2291 |
| | | | | 343/702 |
| 2016/0366554 A1* | 12/2016 | Markhovsky | ................ | H04L 5/005 |
| 2017/0012364 A1* | 1/2017 | Yang | ................ | H01Q 21/24 |
| 2018/0358707 A1* | 12/2018 | Jamaly | ................ | H01Q 21/24 |
| 2019/0305425 A1* | 10/2019 | Jamaly | ................ | H01Q 21/0025 |

OTHER PUBLICATIONS

Partial European Search Report for EP19198743.7, dated Feb. 25, 2020, 9 pages.
Search report for GB1815362.7, dated Dec. 2, 2020, 3 pages.

* cited by examiner

End view

METHODS AND SYSTEMS FOR IMPLEMENTING AND OPERATING MULTIPLE-INPUT AND MULTIPLE-OUTPUT (MIMO) ANTENNAS

CLAIM OF PRIORITY

This patent application claims the right of priority to and from United Kingdom (GB) Patent Application No. 1815362.7, dated Sep. 20, 2018, and United Kingdom (GB) Patent Application No. 1911016.2, dated Aug. 1, 2019. Each of the above applications is hereby incorporated herein by reference in its entirety.

TECHNICAL FIELD

The present disclosure relates to communication solutions. In particular, various embodiments in accordance with the present disclosure relate to methods and systems for implementing and operating antennas, particularly multiple-input and multiple-output (MIMO) antennas, for radio telecommunications.

BACKGROUND

The present disclosure relates to antennas. In this regard, conventional antenna systems and methods for implementing and using them in telecommunications networks, if any existed, may be costly, cumbersome and inefficient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and/or methods are provided for IMPLEMENTING AND OPERATING MULTIPLE-INPUT AND MULTIPLE-OUTPUT (MIMO) ANTENNAS, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION

Figure 1:
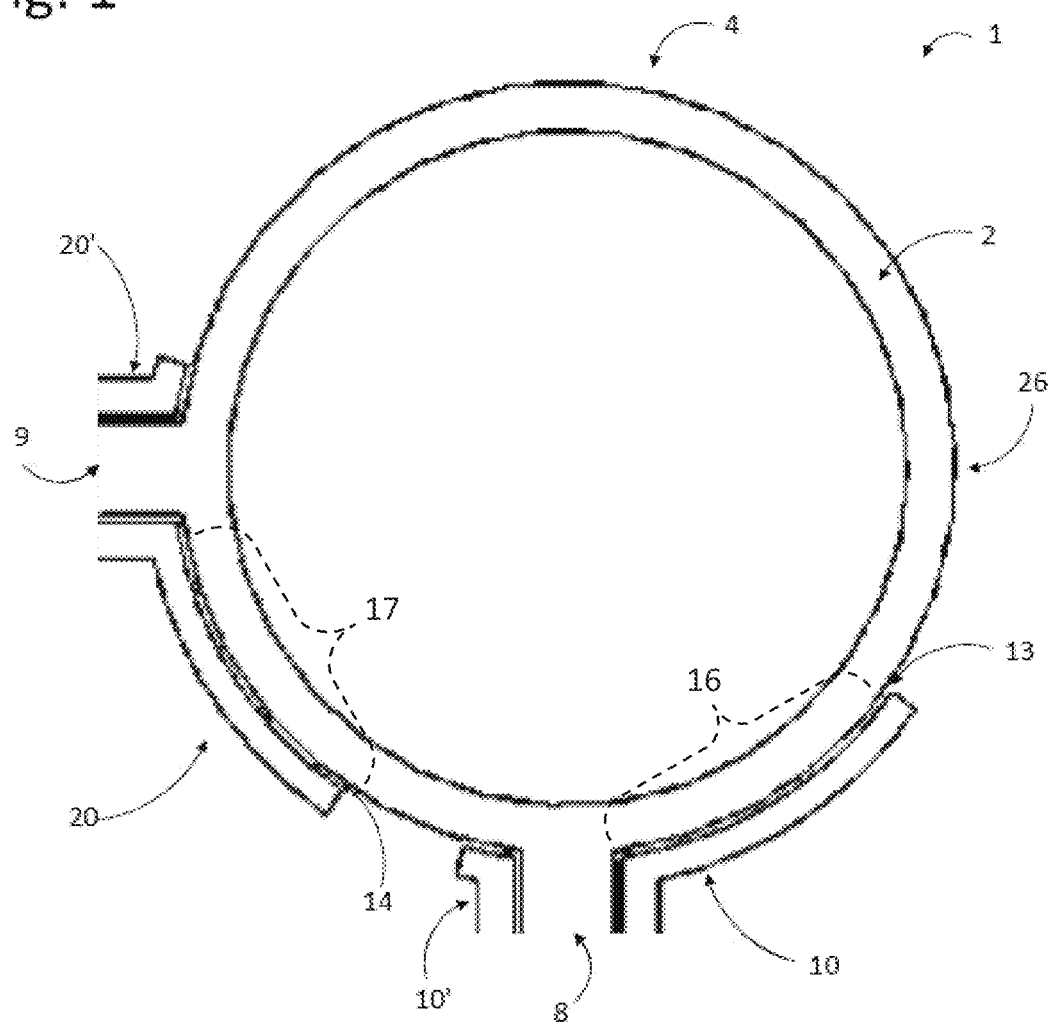
FIG. 1 illustrates a plan view and an end view of an example antenna, in accordance with the present disclosure.
Figure 1:
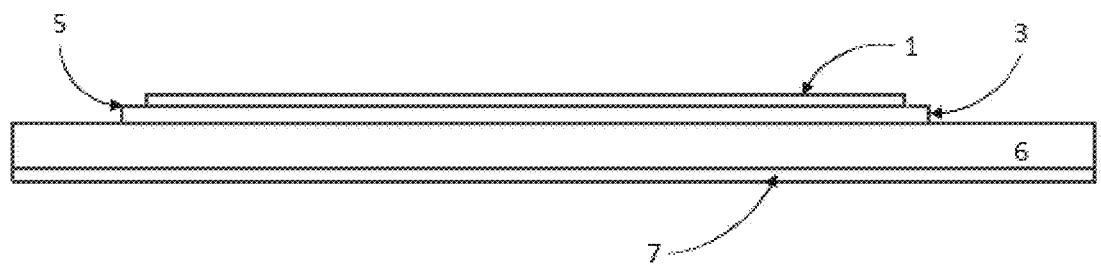

As utilized herein the terms "circuits" and "circuitry" refer to physical electronic components (e.g., hardware), and any software and/or firmware ("code") that may configure the hardware, be executed by the hardware, and or otherwise be associated with the hardware. As utilized herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Certain example implementations in accordance with the present disclosure may be found in systems and methods for implementing and operating multiple-input and multiple-output (MIMO) antennas for radio telecommunications, as described in more detail below.

In this regard, ultra-wideband (UWB) is a radio technology that uses a very low energy level for short-range, high-bandwidth communications over a large portion of the radio spectrum. For example, in typical UWB communications transmit information may be spread over a bandwidth of 500 MHz or more. The International Telecommunication Union Radiocommunication Sector (ITU-R), for example, defines UWB as an antenna transmission for which emitted signal bandwidth exceeds the lesser of 500 MHz or 20% of the arithmetic center frequency.

Use of UWB communications may be preferable in some settings due to desirable performance characteristics. For example, bandwidth and time resolution are inherently related, with the upper limit on the pulse rate of a communication method typically being set by the communication bandwidth. Thus, UWB based systems may enable more accurate use of techniques such as pulse-position or time modulation. Information may also be modulated on UWB signals (pulses) by encoding the polarity of the pulse, its amplitude and/or by using orthogonal pulses.

Existing antenna solutions for use in conjunction with UWB communications may be have some disadvantages and/or shortcomings. Accordingly, various example implementations in accordance with the present disclosure may be directed at providing low profile antenna systems that support multiple-input and multiple-output radio communications, particularly for use in conjunction with ultra-wideband (UWB) communications. For example, certain implementations in accordance with the present disclosure provide antenna systems that provide two transmit and/or receive channels in a single antenna structure. As such, implementations in accordance with the present disclosure may provide and/or support multiple input multiple output radio telecommunication, in optimized and enhanced manner compared to any existing solutions.

An example antenna in accordance with the present disclosure may comprise a conductive annulus arranged on the surface of a flat planar dielectric substrate. An antenna comprises first and second lands of conductive material that are also arranged on the surface of the substrate, outside the annulus. The first conductive land provides a part of a first port for exciting a first polarization mode of the antenna. The second conductive land provides a part of a second port for exciting a second polarization mode of the antenna, orthogonal to the first mode. The example antenna may also comprise two stem regions of conductive material on the surface of the substrate, connected to an outward edge of the annulus. The two conductive lands are each arranged adjacent to one of these stems, and the stems and the conductive lands may together provide the ports. Such antennas may provide a symmetrical radiation pattern and reduce coupling between two orthogonal ports as compared to prior art antennas.

An example antenna in accordance with the present disclosure may comprise a planar dielectric substrate; a conductive annulus on a first surface of the substrate; a first conductive land on the first surface, wherein the first land is outside the annulus and wherein an edge of the first land adjacent to the outward edge of a first portion of the annulus is spaced from the outward edge of the annulus to provide a first slot therebetween; a second conductive land on the first surface wherein the second land is outside the annulus and wherein an edge of the second land adjacent to the outward edge of a second portion of the annulus is spaced from the outward edge of the annulus to provide a second slot therebetween.

An example method for operating an antenna implemented in accordance with the present disclosure, wherein the antenna comprises a first port, and a second port, may comprise providing a first input/output channel in a first frequency range at the first port using a first polarization mode of the antenna; providing a second input/output channel in a second frequency range at the second port using a second polarization mode of the antenna; wherein the first polarization mode is orthogonal to the second polarization mode.

The antenna may comprise a stub on the first surface connected to the annulus. The stub may comprise a first part connected to, and protruding radially outward from, the outward edge of the annulus. The stub may comprise a second part connected to, and protruding radially inwards from, to an inward edge of the annulus. The stub may be connected to the annulus between the first portion and the second portion. The first conductive land may comprise a first arc shaped land.

The antenna may comprise a first stem disposed on the first surface and connected to the outward edge of the annulus. At least one edge of the first stem may lie adjacent to and parallel to an edge of the first land. The first land may comprises a first part and a second part separated from the first part by the first stem. The second conductive land may comprise a second arc shaped land. The antenna may comprise a second stem disposed on the first surface and connected to the outward edge of the annulus. At least one edge of the second stem may lie adjacent to and parallel to an edge of the second land. The second land may comprise a first part, and a second part separated from the first part by the second stem. The angular separation about the circumference of the annulus between the first stem and the second stem may be 90°.

The stub may be equidistant from the first stem and the second stem. The angular separation about the circumference of the annulus between the stub and the first stem may be one of 45° and 135°. The stub may have a first end connected to the annulus, and a second end positioned towards the center of the annulus relative to the first end, and the second end may comprise a circular element. The stub may comprise at least one protuberance on the surface connected to and transverse to the stub.

The first stem may comprise a tapered portion arranged so that the spacing between the first stem and the first land gets wider towards the annulus. The second stem may comprises a tapered portion arranged so that the spacing between the second stem and the second land gets wider towards the annulus.

The antenna may comprise a first signal connection connected to the first land, and a second signal connection connected to the second stem, wherein the first stem is grounded and the second land is grounded. The first land may have a first length and the second land may have a second length different from the first length.

An example transceiver system in accordance with the present disclosure, comprising at least one example antenna in accordance with the present disclosure, may comprise a first transmit/receive system connected to the first land for exciting the first slot; and a second transmit/receive system connected to the annulus for exciting the second slot; wherein the first transmit/receive system is configured to provide a first input/output channel, and the second transmit/receive system is configured to provide second input/output channel. The second transmit/receive system may be connected to the annulus by the second stem. The first or second stem may be grounded.

An example method of operating a communication system implemented in accordance with the present disclosure, and which incorporates at least one example antennas implemented in accordance with the present disclosure, may comprise operating the first transmit/receive system to provide a first input/output channel using a first polarization mode of the antenna; operating the second transmit/receive system to provide a second input/output channel using a second polarization mode of the antenna. The example method may comprise providing multiple-input and multiple-output (MIMO) communication using the system. Providing a first input/output channel may comprise at least one of receiving and transmitting a signal in the first frequency range. Providing a second input output channel may comprise at least one of receiving and transmitting a signal in the second frequency range.

The first port may comprise a first slot having a first length and the second port may comprise a second slot having a second length different to the first length. The first length may correspond to a characteristic frequency of the first slot, and the second length may correspond to a characteristic frequency of the second slot.

An example antenna in accordance with the present disclosure may comprise a planar dielectric substrate; a conductive annulus on a first surface of the substrate; a first conductive land on the first surface, wherein the first land is outside the annulus and wherein an edge of the first land adjacent to the outward edge of a first portion of the annulus is spaced from the outward edge of the annulus to provide the first slot therebetween; a second conductive land on the first surface wherein the second land is outside the annulus and wherein an edge of the first land adjacent to the outward edge of a second portion of the annulus is spaced from the outward edge of the annulus to provide the second slot therebetween.

FIG. 1 illustrates a plan view and an end view of an example antenna, in accordance with the present disclosure. Shown in FIG. 1 is an antenna 1.

As shown in FIG. 1, the antenna 1 is disposed on the surface 5 of a flat dielectric substrate 3. In the example implementation shown in FIG. 1, the substrate 3 comprises a dielectric having a relative permittivity of between about 3.2 and 3.6. The substrate 3 may be 0.8 mm thick, or between about 0.5 mm and 1.5 mm. For example, the substrate may be square and 50 mm wide, but other sizes and shapes may be used.

The antenna 1 may comprise an arrangement of laminar conductors 4, 10, 10', 20, 20' disposed on the surface 5 of the substrate 3. For example, as shown in the implementation illustrated in FIG. 1, the antenna 1 comprises an annular land 4, a first land 10, 10' and a second land 20, 20'.

As shown in FIG. 1, the annular land 4 comprises a circular annulus 2 provided by a circular track of conductive material disposed on the surface 5 of the substrate 3. The annulus 2 may have a radius of about 23 mm measured from the center of that circle to the middle of the track's width, and the track may have a width of about 3 mm (e.g., it has an inner radius of about 21.5 mm, and an outer radius of about 24.5 mm). The disclosure is not so limited, however, and other dimensions may be used. In an example implementation, the laminar conductor that makes up these lands (2, 10, 10', 20, 20') may comprise copper, and may be about 35 μm thick.

The annular land 4 also comprises a first stem 8 and a second stem 9. The stems each extend radially out from an outward edge 26 of the annulus. The first stem 8 of the annular land may be spaced from the second stem 9 of the annular land by, e.g., about ¼ the circumference of the annulus 2, e.g., the angular separation of the second stem 9 of the annular land and the first stem 8 of the annular land (subtended at the center of the annulus) may be about 90°.

As shown in FIG. 1, the first land 10, 10' comprises two substantially L-shaped parts. These two L-shaped parts are different sizes, and lie on either side of the first stem 8 of the annular land. The larger of the two L-shaped parts 10 lies on the far side of the first stem 8 from the second stem 9. The 'back' of this L-shaped part is arc shaped, whereas the 'base' of this L-shaped part is straight. The arc shaped back of the 1' lies alongside the radially outward edge 26 of the annulus 2 adjacent the first stem 8 of the annular land. The edge of this arc shaped part that is adjacent to the annular land 4 is parallel to a first portion 16 of the radially outward edge 26 of the annulus 2.

The bottom edge of the base of the 1' may run parallel to the edge of the first stem 8 of the annular land 4. The spacing between the L-shape and the annular land may be even along the length of these edges. The smaller of the two L-shaped parts 10' lies on the other side of the stem 8 from the larger one (e.g., on the side nearest to second stem 9). The 'back' of this smaller L-shaped part is straight and lies alongside the first stem 8 whilst the 'base' of this smaller L-shaped part may be arc shaped and lies alongside the radially outward edge 26 of the annulus 2, for a short part of that edge between the first stem 8 and the second stem 9.

The second land 20, 20' illustrated in FIG. 1 may be the same shape as the first land 10, 10'. For example, the second land 20, 20' may comprise two substantially L-shaped parts. These two L-shaped parts 20, 20' are different sizes, and lie on either side of the second stem 9 of the annular land 4. For example, the larger of the two L-shaped parts 20 lies on the near side of the second stem 9 (e.g., nearest to the first stem 8). The 'back' of this L-shaped part 20 is arc shaped, whereas the 'base' of this L-shaped part 20 is straight. The arc shaped back of the 1' lies alongside the radially outward edge 26 of the annular land adjacent the second stem 9 of the annulus 2. The edge of this arc shaped part that is adjacent to the annular land is parallel to the radially outward edge 26 of the annulus 2 (e.g., along a second portion 17 of the outward edge 26 between the first stem 8 and the second stem 9).

The bottom straight edge of the base of the 1' may run parallel to the edge of the second stem 9 of the annular land along at least a part of its length. The spacing between the L-shape and the annular land may be even along the length of these edges. The smaller of the two L-shaped parts 20' lies on the other side of the second stem 9 from the larger one (e.g., on the side farthest from first stem 8). The 'back' of this smaller L-shaped part is straight and lies alongside the second stem 9 of the annular land whilst the 'base' of this smaller L-shaped part may be arc shaped and lies alongside the radially outward edge 26 of the annular land, for a short part of that edge from second stem 8.

The length of the arc shaped portions of the larger L-shaped parts of the first and second lands 10, 20, may be selected based on the operating frequency of the antenna. For instance, the arc shaped portions 10, 20 may be around 25 mm long, and this may provide a resonance frequency at 3 GHz (25 mm is a quarter wavelength). The length of the arc shaped portions 10, 20 may be changed if there is a wish to vary this frequency.

In accordance with the present disclosure, the radius of the ring may be chosen based on the desired operating frequency range of the antenna 1. For an operating frequency band of around 3 GHz, for example, the radius of the annulus 2 (main ring radius) may be about 23 mm, measured from the center of the ring, to the middle of the conductive track which makes it up. The width of the ring may be about around 3 mm. Thus, for the example implementation shown in FIG. 1, means the inner radius of the ring (23) would be 21.5 mm.

To provide one port of the antenna, a first slot 13 is formed by the space between the curved edge of the first conductive land 10 and the first portion 16 of the curved outward edge 26 of the annulus adjacent to that curved edge. This slot 13 may act as a waveguide. A radio frequency (RF) signal may be applied to the first conductive land 10, 10', or to the part of the annular land 4 which lies alongside the first conductive land 10, 10' (e.g., the first portion 16 or the first stem 8) to excite slot 13 and drive a first polarization mode of the fundamental frequency of the antenna 1.

To provide a second port of the antenna, a second slot 14 is formed by the space between the curved edge of the second conductive land 20 and the second portion 17 of the outward edge 26 of the annulus adjacent to that curved edge. This slot 14 may act as a second waveguide. Thus, an RF signal may be applied to the second conductive land 20, 20', or to the part of the annulus which lies alongside the curved edge of the second conductive land 20, (e.g., the second portion 17 or the second stem 9) to excite this slot and drive a second polarization mode of the fundamental frequency of the antenna 1. The first polarization mode and the second polarization mode may be orthogonal to each other.

As shown in FIG. 1, the antenna 1 may also comprise a ground plane conductor 7, which may be on the other side of the substrate 3, and may be separated from the substrate 3 by a dielectric 6. This dielectric 6 may comprise an air gap, and may comprise a spacer material such as foam. The dielectric 6 may have a relative permittivity of 1. The spacing between the first surface 5 of the substrate 3 and the ground plane 7 may be about 1.5 cm. This may enable the antenna 1 to provide a unidirectional radiation pattern. A smaller spacing may be used, e.g., if the dielectric 6 has a permittivity greater than 1.

The whole antenna 1, including the dielectric 6 and a ground plane (e.g., a perfect electrical conductor (PEC) ground plane) may be provided within a box, or any other type of encapsulation. This encapsulation may be adapted to enable the apparatus to be secured—e.g., to a window pane of a domestic dwelling, a commercial premises, or other buildings. In some embodiments, the dielectric 6 may be provided by the window pane. In these embodiments, the backside of the substrate 3 may be fixed (e.g., by adhesive) to one side of the window pane, and the ground plane conductor may be provided by a conductive mesh disposed on the other side of the window pane. Where a ground plane conductor is provided (with or without the dielectric) the two slots described above may act as a "conductor backed" coplanar waveguide. The spacing between the antenna 1 and the ground plane conductor 7 may vary, and the antenna 1 may need to be retuned based on the spacing and on the permittivity of the dielectric 6. For example retuning may include altering the radius of the antenna and/or the lengths of the first and second lands 10, 10', 20, 20'.

The first slot 13 (formed by the first conductive land 10) and the second slot 14 (formed by the second conductive land 20) may be arranged transverse to one another. For example, the slot 13 may be orthogonal to the slot 14 on the surface of the substrate 3. The angular separation between their respective centers may be 90°, for example. The slots 13, 14, are curved and need not be orthogonal, in a precise geometric sense, provided that they excite mutually orthogonal modes of the antenna's fundamental frequency. The feed of each slot (e.g., its connection to a transmit/receive signal) may be separated from the feed of the other slot by 90° about the circumference of the antenna 1.

Figure 2A:
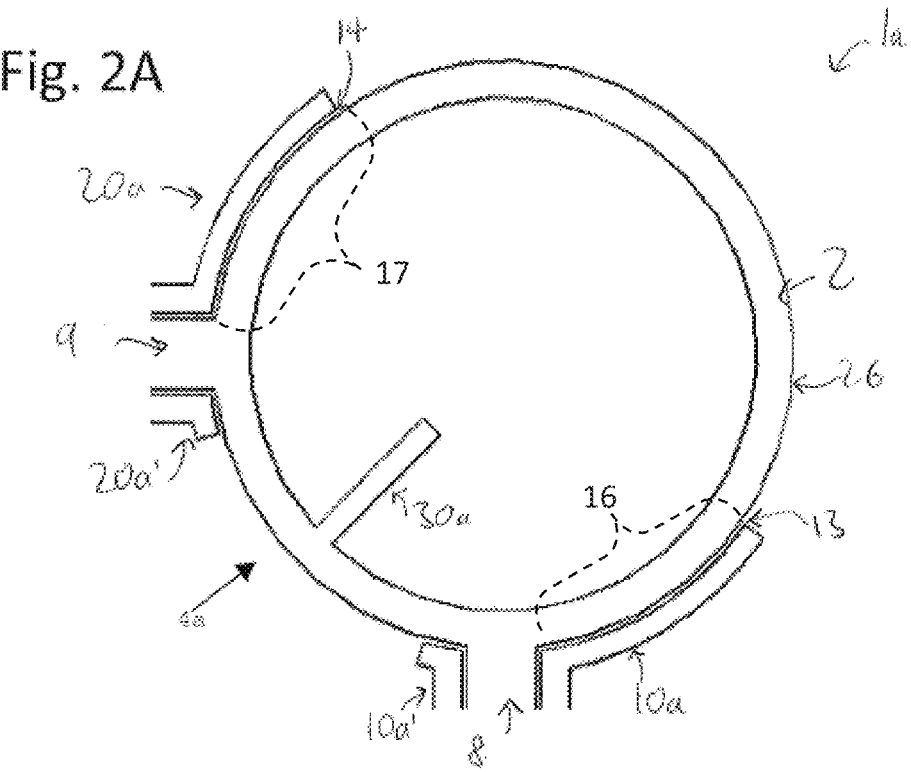
FIGS. 2A-C illustrate examples of antennas comprising a decoupling stub, in accordance with the present disclosure.
Figure 2B:
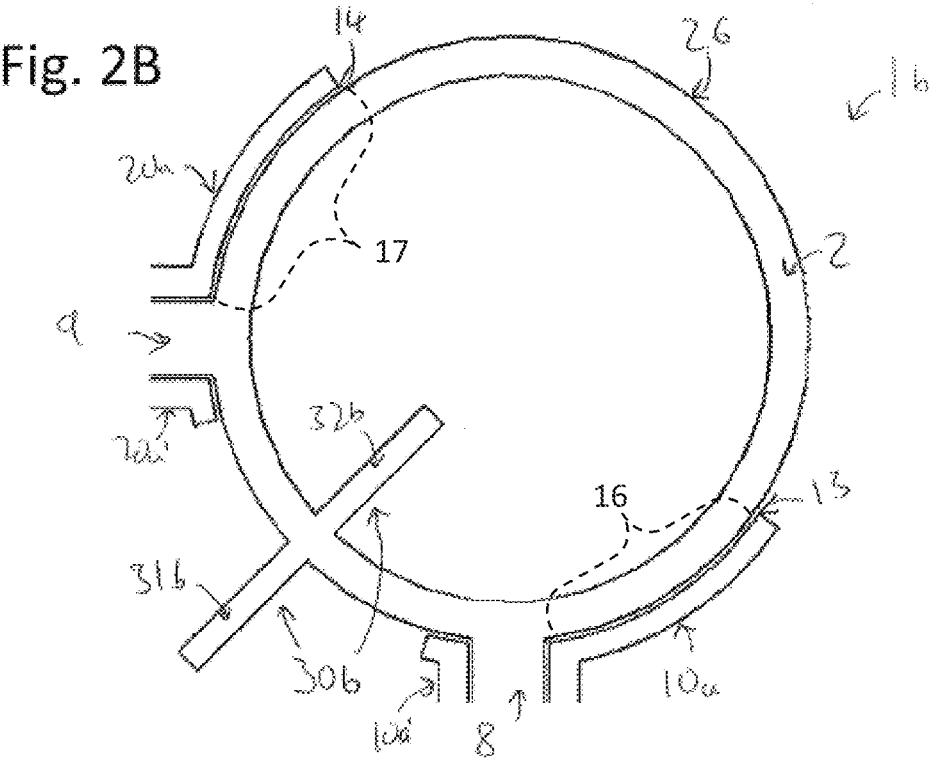
Figure 2C:
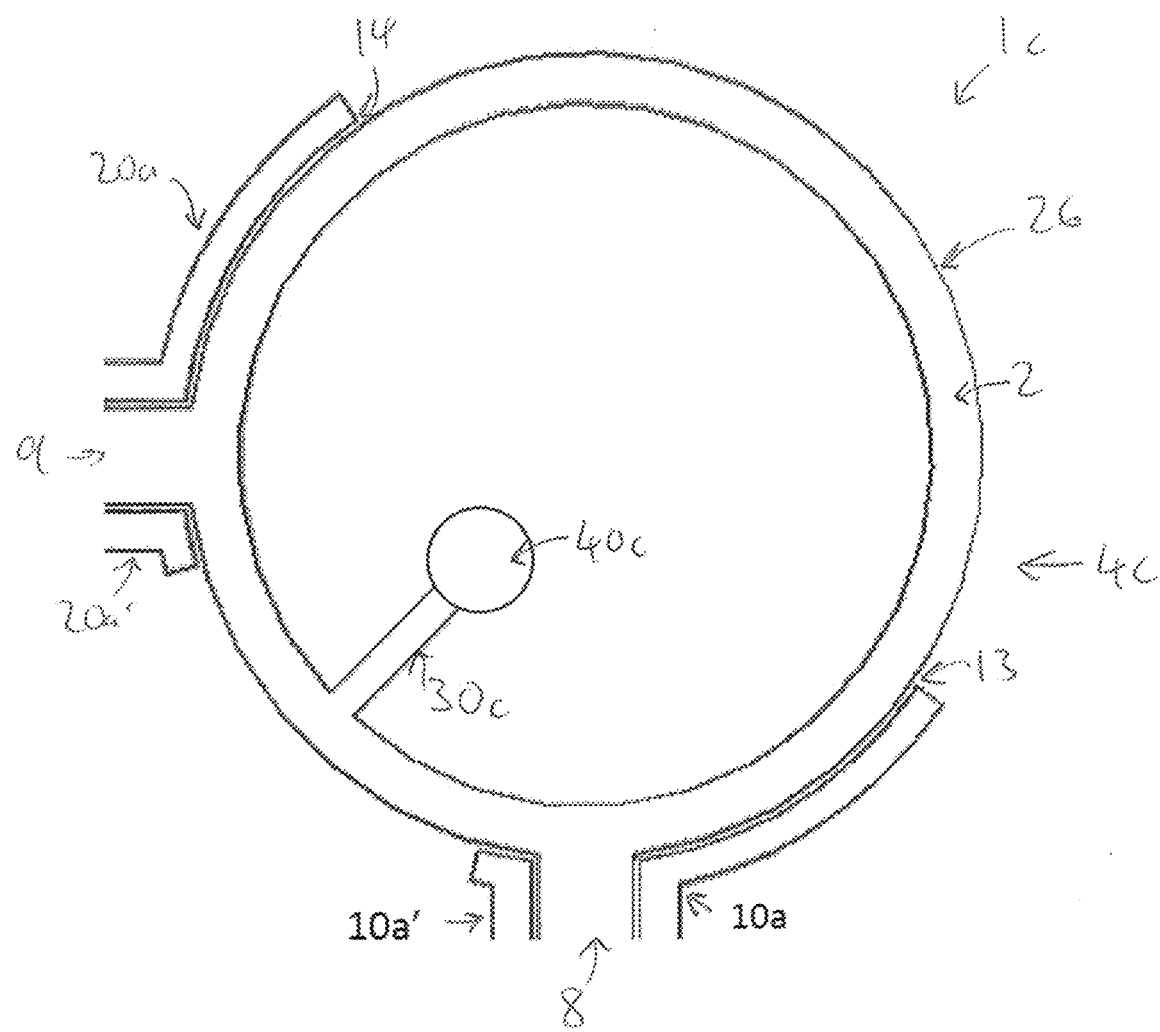

FIGS. 2A-C illustrate example implementations, of antennas comprising a decoupling stub, in accordance with the present disclosure.

Shown in FIG. 2A is a plan view of another example antenna 1a. The antenna 1a may be similar to the antenna described above with reference to FIG. 1. As shown in FIG. 2A, for example, the antenna 1a comprises an annular land, first land 10a, 10a' and second land 20a, 20a', arranged similarly as described above with reference to similar elements in the antenna 1 of FIG. 1, other than in that the position of the two parts of the second land 20a, 20a' relative to the second stem 9 may be reversed. For example, the larger L-shaped part 20a of the second land lies on the far side of the second stem 9, e.g., the smaller part 20a' of the second land lies adjacent a second portion 17 of the outward edge of the annulus 2a between the first stem 8a and the second stem 9a. The smaller L-shaped part 20a' of the second land lies on the near side of the second stem 9 from the first stem 8a, adjacent to an outward edge of the annulus 2.

Additionally, the annular land 4a further comprises a stub 30a, which may act to decouple the first stem 8 from the second stem 9. The stub 30a may comprise a laminar conductor that may lie flat on the surface 5 of the substrate 3. The stub 30a may have a first end connected to an inward edge of the annulus 2, and a second end towards the center of the region of the surface 5 surrounded by the annulus 2. The stub 30a may be straight and aligned radially in the plane of the annulus 2 from the first end to the second end. The stub 30 is connected to the annulus 2 at a position between the first stem 8a and the second stem 9, for example equidistant between the first stem 8a and the second stem 9 such that the angle between the stub 30a and the first stem 8 is 45° and the angle between the stub 30a and the second stem 9 is 45°. The longitudinal axis of the stub 30a defines an axis of symmetry of the antenna 1. The stub 30a may be substantially rectangular. The width of the stub may be slightly less than the width of the annulus 2.

Shown in FIG. 2B is a plan view of another example antenna 1b. The antenna 1b may be similar to the antenna 1a, as described with reference to FIG. 2A, other than in that the stub 30b of the antenna 1b may have a first part 32b, and a second part 31b. The first part 32b is connected to the inward edge of the annulus 2 and extends from there toward the center of the annulus 2. The second part 31b is connected to the outward edge of the annulus 2 and extends from there radially outward from the annulus 2. The stub 30b may extend both radially inwards towards the center of the annulus and outwards away from the annulus may improve decoupling between two ports of the antenna such that the operating bandwidth of the antenna is widened. This may also increase the degree of freedom for tuning the antenna at different operating bands.

The first part 31b and the second part 32b may be connected to opposite edges of the same part of the annulus 2—e.g., they may both be disposed at the same angular position around its circumference. In this configuration, the stub 30b extends from a first end at the radially outward edge of the first part 31b to a second end at the radially inward edge of the second part 32b. The stub 30b may comprise a track of conductive material on the substrate from the first end to the second end, connected to the annulus between the two ends. For example, the stub 30b may be rectangular. The first part 31b and the second part 32b may be the same radial length as each other, and may be the same width as each other.

The stub 30b may be equidistant between the first stem 8 and the second stem 9, such that the angle between the stub 30b and the first stem 8 is 45° and the angle between the stub 30b and the second stem 9 is 45°. The stub 30b may be disposed on an axis of symmetry of the antenna 1b, e.g., the disposition of the conductive material on the surface 5 of the substrate 3 may be symmetric about a centerline of the stub 30b.

Shown in FIG. 2C is a plan view of another example antenna 1c. The antenna 1c may be similar to the antenna 1a, as described with reference to FIG. 2A, other than in that the antenna 1c comprises a circular conductive element 40c at the radially inward end of the stub 30c. In particular, the antenna 1c comprises a stub 30c that extends radially towards the center of the annulus 2 from a first end connected to the inward edge of the annulus 2, to a second end inside the annulus 2c. The second end of the stub 30c is connected to the circular element 40c. The circular element 40c comprises a laminar conductor disposed on the surface 5 of the substrate 3. The circular element 40c has a diameter greater than the width of the stub 30c. In some instances, the circular element 40c may be provided by the same laminar element as the stub 30c—e.g., the stub 30b may comprise the circular element at its second end.

Figure 3:
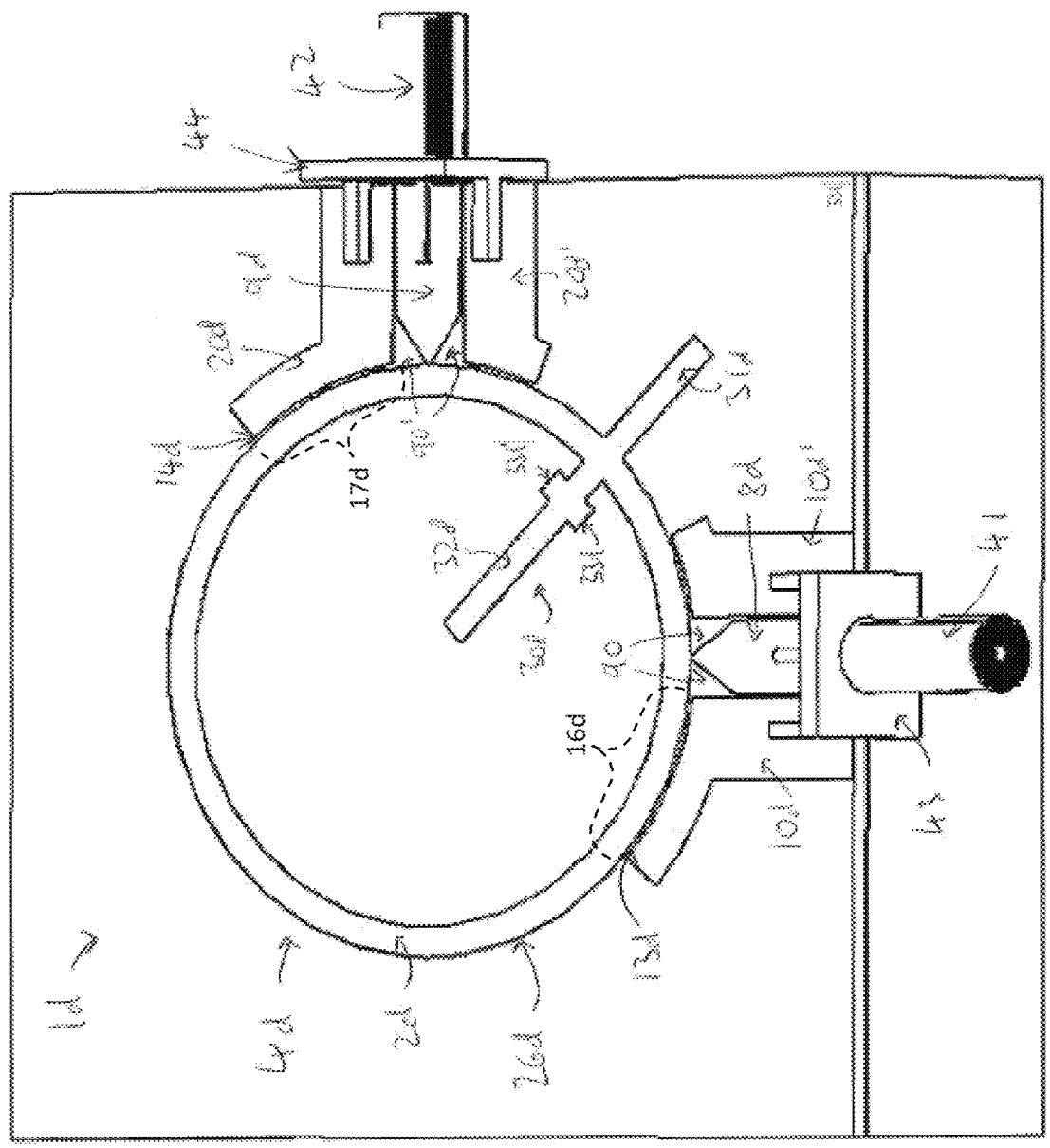
FIG. 3 illustrates an example antenna and electrical connectors, in accordance with the present disclosure.

FIG. 3 illustrates an example antenna and electrical connectors, in accordance with the present disclosure. Shown in FIG. 3 is an apparatus 1000 that comprises an antenna 1d.

The antenna 1d may be similar to any antenna described with reference to FIG. 1 to FIG. 2C. As shown in FIG. 3, the apparatus 1000 also comprises, in addition to the antenna 1d, a first signal connection 41, 43, and a second signal connection 42, 44.

The antenna 1d illustrated in FIG. 3 comprises an annular land 4d, a first land 10d, 10d', and a second land 20d, 20d'. The annular land 4d comprises an annulus 2d and the first land 10d, 10d' and second land are arranged adjacent to an outward edge of the annulus 2d as with the antennas described with reference to FIG. 2A to FIG. 2C. The annular land 4d further comprises a first stem 8d and a second stem 9d, both connected to the outward edge of the annulus 2d.

The first signal connection 41, 43 is connected to apply a first signal voltage between the first stem 8d and the first land 10d, 10d'. The second signal connection 42, 44 is connected to apply a second signal voltage between the second stem 9d and the second land 20d, 20d'. These signal connections 41, 42, 43, 44, may be connected to the stems 8d, 9d, and lands 10d, 10d', 20d, 20d' toward their radially outward ends (e.g., away from the annulus).

The first stem 8d lies on the surface 5 of the substrate 3 in a gap between the first part 10d and the second part 10d' of the first land. Likewise, second stem 9d lies on the surface 5 of the substrate 3 in a gap between the first part 20d and the second part 20d' of the second land. In both cases, the edges of the stems 8d, 9d, and lands 10d, 10d', 20d, 20d' are spaced apart on the substrate 3 to provide a slot between stem 8d, 9d, and land 10d, 10d', 20d, 20d' on either side of each stem.

In particular, the first stem 8d comprises a first portion with straight edges parallel with the adjacent straight edges of the first land (10d, 10d'). The first stem 8d also comprises a tapered portion connected between the first portion and the annulus, and tapered so that it gets narrower towards the annulus 2d (e.g., the spacing between the edges of the first stem 8d and the adjacent edges of the first land 10d, 10d' gets wider closer to the annulus 2d. The second stem 9d is the same in that it also comprises a first portion and a tapered portion to provide the same shaped slot between the second stem 9d and the second land 20d, 20d'.

The first and second stems 8d, 9d are arranged such that each provide transition in width tapers from the width of the stem to a reduced width at the edge of the annulus 2d. The spacing between the first land 10d, 10d' and the first stem 8d as well as that between the second land 20d, 20d' and the second stem 9d is thereby larger closer to the annulus 2d.

For example the spacing between each of the L-shaped parts 10d, 10d', 20d, 20d' and the respective first and second stems 8d, 9d may increase to almost half the width of the gap between the larger 10d, 20d, and smaller 10d', 20d' parts of the first and second lands at the point at which the stems 8d, 9d, connect to the annulus 2d. Thus, two sets of two substantially triangular-shaped gaps 90, 90' are formed in the regions where each of the stems 8d, 9d, connects to the annulus 2d. The edges of the triangles 90, 90' are defined by the annulus 2d, the stem and each of the L shaped parts adjacent to the stem.

The tapering of the feed point transition portion of the first and second stems 8d, 9d may assist in resolving problems relating to impedance matching. Narrowing the stems 8d, 9d in this region may assist with capacitance-inductance tuning of the antenna 1d.

A first slot 13d is formed by the space between the curved edge of the first conductive land 10d and the first portion 16d of the outward edge 26d of the curved annulus adjacent to that curved edge. This slot 13d may act as a waveguide. An RF signal may be applied to the first conductive land 10d, 10d' or to the part of the annulus 2d which lies alongside the curved edge of the first conductive land 10d, 10d' to excite this slot 13d and drive a first polarization mode of the fundamental frequency of the antenna 1d.

A second slot 14d is formed by the space between the curved edge of the second conductive land 20d and the second portion 17d of the outward edge 26d of the annulus adjacent to that curved edge. The slot 14d may act as a second waveguide. Thus, an RF signal may be applied to the second conductive land 20d, 20d' or to the part of the annulus which lies alongside the curved edge of the second conductive land 20d, to excite this slot and drive a second polarization mode of the fundamental frequency of the antenna 1d.

The first polarization mode and the second polarization mode may be orthogonal to each other. Optionally, to achieve this, the first stem 8d of the annular land 4d may be spaced from the second stem 9d of the annular land 4d by, e.g., about ¼ the circumference of the annulus 2d, e.g., the angular separation of the second stem 9d of the annular land 4d and the first stem 8d of the annular land 4d (subtended at the center of the annulus) may be about 90°.

The first slot 13d (formed by the first conductive land 10d) and the second slot 14d (formed by the second conductive land 20d) may be arranged transverse to one another. For example, the slot 13d may be orthogonal to the slot 14d on the surface of a substrate 3d. The angular separation between their respective centers may be 90°, for example. The slots 13d, 14d are curved and need not be orthogonal in a precise geometric sense. The feed of each slot (e.g., its connection to a transmit/receive signal) may be separated from the feed of the other slot by, e.g., 90° about the circumference of the antenna 1d.

The antenna 1d further comprises another decoupling stub 30d, as described above with reference to FIGS. 2A-C. The stub 30d comprises a first part 31d connected to the outward edge of the annulus 2d. The stub 30d also comprises a second part 32d connected to the inward edge of the annulus 2d. The stub 30d may be straight, and may extend in a radial direction from its first end outside the annulus 2d towards its second end nearer to the center of the annulus 2b. The stub 30d may be substantially rectangular and may have other features of the stubs described above.

Unlike the antennas described above with reference to FIGS. 2A-C, the stub 30d further comprises two rectangular protuberances 33d, 33d' on the second part 32d of the stub 32d. The protuberances 33d, 33d' may extend from opposite sides of the second part 32d of the stub 30d. As a result, the second part 32d of the stub 30d may be cross-shaped. The protuberances 33d, 33d' may have a length less than half the length of the second part of the stub 32d, and may be positioned closer to the point at which the second part of the stub 32d connects to the annulus 2d than to the second end of the stub 30d inside the annulus 2d.

The first signal connection may be provided by a first cable 41 electrically connected to the first land 10d, 10d' and to the first stem 8d via a first connector 43. The second signal connection may be provided by a second cable 42 electrically coupled to the second land 20d, 20d' and the second stem 9d via a second connector 44.

The first and second cables 41, 42 may be coaxial cables, each comprising an inner conductor and an outer conductor, such as a braid. The inner conductor may be connected to the stem 8d, 9d and the outer conductor may be connected to the first/second land 10d, 10d', 20d, 20d', or vice versa.

An RF signal may be applied from the first and second cables 41, 42 to the annular land 4d and the first 10d, 10d' and second 20d, 20d' lands respectively to drive the antenna 1d. Application of an RF signal is further described below with reference to the antenna 1d of FIG. 3. It should be appreciated in the context of the present disclosure that the antennas 1, 1a, 1b, 1c, described above with reference to FIGS. 1 and 2A-C may be electrically connected to a cable, as described with reference to FIG. 3.

An RF signal may be applied to the first conductive land 10d, 10d' or to the annulus adjacent the first conductive land (e.g., via the first stem), to excite the first slot 13d and drive one polarization mode of the antenna 1d of any of the above described example implementations. Likewise, an RF signal may be applied to the second conductive land 20d, 20d', or to the annulus adjacent the second conductive land (e.g., via the second stem), to excite the second slot 14d and drive a second polarization mode of the antenna 1d (e.g., orthogonal to the first polarization mode). The same may be done with the other example antennas described above.

The first and second mode may be, for example, orthogonal fundamental (first order) modes. Two independent RF signals may thus be communicated simultaneously via the antenna 1. As noted above, the 'backs' of the larger L-shaped parts 10d, 20d of the first and second land are arc shaped, whereas the 'bases' are straight. In some embodiments, both the 'back' and the 'base' of the L-shaped lands 10, 20 may be straight. However without wishing to be bound by theory, it is believed that coupling between these two independent RF signals may be reduced by the use of a curved (arc shaped) edge on the back of the L-shaped parts of the first and second lands 10, 10', 20, 20'.

Figure 4A:
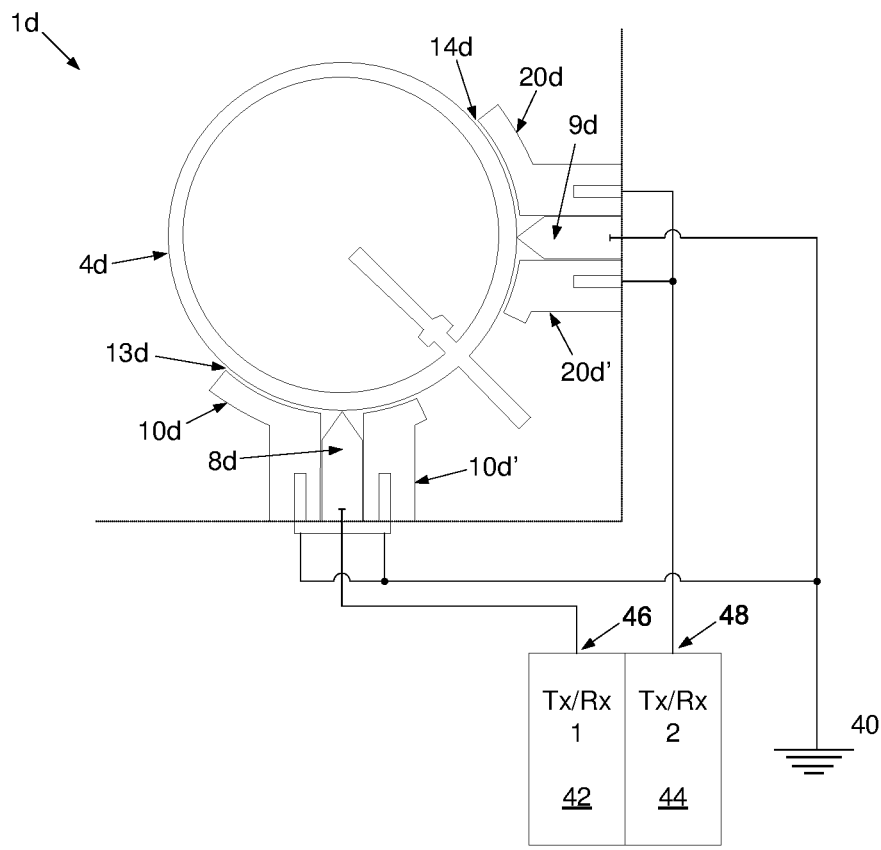
FIGS. 4A-B illustrate two example arrangements of a multiple input multiple output (MIMO) communications apparatus comprising an example antenna implemented in accordance with the present disclosure.
Figure 4B:
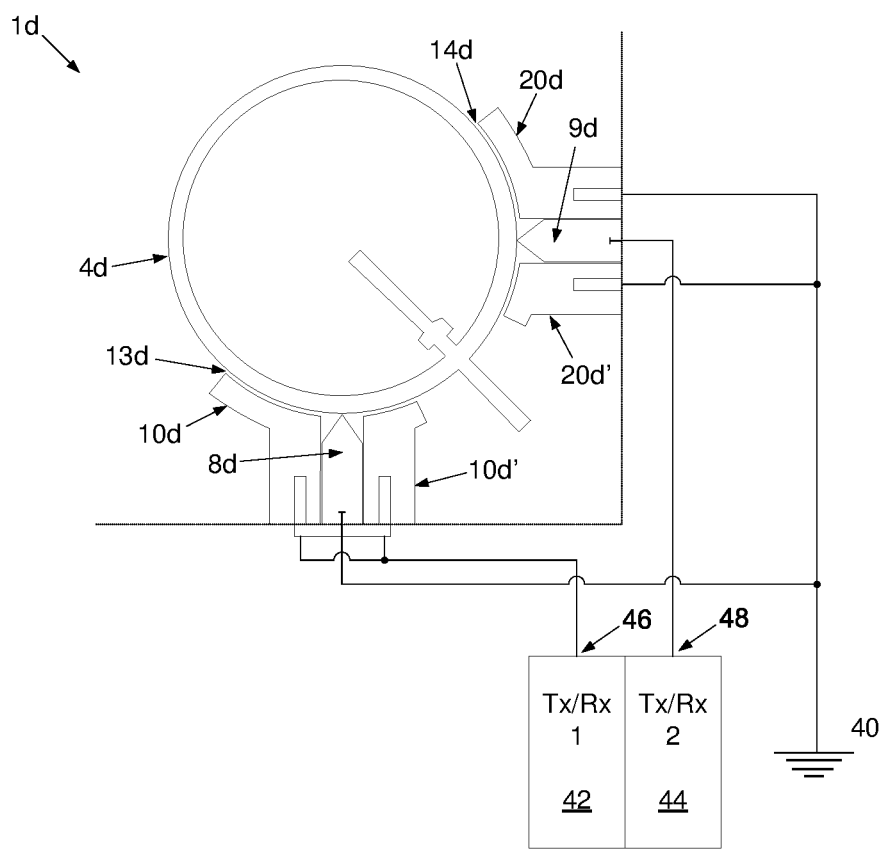

FIGS. 4A-B illustrate two example arrangements of a multiple input multiple output (MIMO) communications apparatus comprising an example antenna implemented in accordance with the present disclosure Shown in FIG. 4A is a system that comprises an instance of the antenna 1d, as described above with reference to FIG. 3, a ground connection 40, and two transmit/receive apparatuses 42, 44, each being configured to transmit and receive RF electrical signals independently of the other. Each transmit/receive apparatus 42, 44 comprises an input/output signal connection for RF electrical signals.

As shown in FIG. 4A, the first stem 8d of the annular land 4d of the antenna 1d is connected to the input/output signal connection 46 of the first transmit/receive apparatus 42. At either side of the stem 8d, the two L-shaped parts 10d, 10d' of the first land are connected to ground 40. The two L-shaped parts of the second land 20, 20d' are connected to the input/output signal connection 48 of the second transmit/receive apparatus 44. The second stem 9d of the annular land 4d is connected to ground 40.

In operation, the first transmit/receive apparatus 42 applies an RF signal to the annular land 4d via its first stem 8d to excite the waveguide provided by the first slot 13d. This drives a first polarization of the fundamental harmonic mode of the antenna 1d. Similarly, the second transmit/receive apparatus 44 applies an RF signal to the second land 20d, 20d' to excite the waveguide provided by the second slot. As with the arrangement shown in FIG. 4A, this may drive a second polarization of the fundamental harmonic mode of the antenna 1d, orthogonal to the first polarization.

Shown in FIG. 4B is a system that comprises an instance of the antenna 1d, as described above with reference to FIG. 3, a ground connection 40, and two transmit/receive apparatuses 42, 44, each being operable to transmit and receive RF electrical signals independently of the other. Each transmit/receive apparatus 42, 44 comprises an input/output signal connection 46, 48 for RF electrical signals.

As shown in FIG. 4B, the first stem 8d of the annular land 4d of the antenna 1d is connected to ground. At either side of this stem 8d, both parts of the first land 10d, 10d' are connected to input/output signal connection 46 of the first transmit/receive apparatus 42. The input/output signal connection 48 of the second transmit/receive apparatus 44 is connected to the second stem 9d of the annular land 4d. The two L-shaped parts of the second land 20d, 20d' are connected to ground 40.

In operation, the first transmit/receive apparatus 42 applies an RF signal to the first land 10d, 10d' to excite the waveguide provided by the first slot 13d. This drives a first polarization of the fundamental harmonic mode of the antenna 1d. Similarly, the second transmit/receive apparatus 44 applies an RF signal to the annular land 4d via its stem 9d to excite the waveguide provided by the second slot 14d. The relative spatial arrangement of the first slot 13d and the second slot 14d (e.g., the two optionally being oriented transverse, e.g., orthogonal, to each other) may enable the antenna 1d to drive a second polarization of the fundamental harmonic mode of the antenna 1d, orthogonal to the first polarization.

The transmit/receive apparatuses 42, 44 illustrated in FIG. 4A and FIG. 4B may comprise any appropriate transceiver. For example, a transmit/receive apparatus may comprise an impedance matching circuit for connection to the antenna 1d, a receive amplifier connected to the impedance matching circuit for amplifying received signals, and a demodulator for demodulating data carried by the signals. The transmit/receive apparatus may also comprise a modulator for encoding data onto an RF signal to be transmitted, and a transmit amplifier for boosting the power of modulated RF signals to be transmitted via the matching circuit to the antenna 1d.

While the multiple input multiple output communications apparatus is described as incorporating antenna 1d as described with reference to FIG. 3, it should be understood that this is merely an non-limiting embodiment, and as such other antennas implemented in accordance with the present disclosure, such as any of the antennas 1, 1a, 1 b, 1c described above with reference to FIGS. 1 and 2A-C may also be used, and may be driven substantially as described above with reference to FIGS. 4A and 4B.

A decoupling stub, such as those described above with reference to FIGS. 2A-C and 3, may be used, such as to improve the decoupling between two ports of an antenna in comparison to an antenna without a stub, such as the antenna 1 described above with reference to FIG. 1. The "double stub" 30b described with reference to FIG. 2B may improve decoupling further in comparison to the stub 30a described with reference FIG. 2A, and may improve the isolation between the two ports. The double-stub 30b may also improve impedance matching at the two ports.

In some instances, a circular or other element on the stub, e.g., the circular element described with reference to FIG. 2C may provide a reduction in the coupling between two ports that may be more uniform across a range of operating frequencies.

Figure 5:
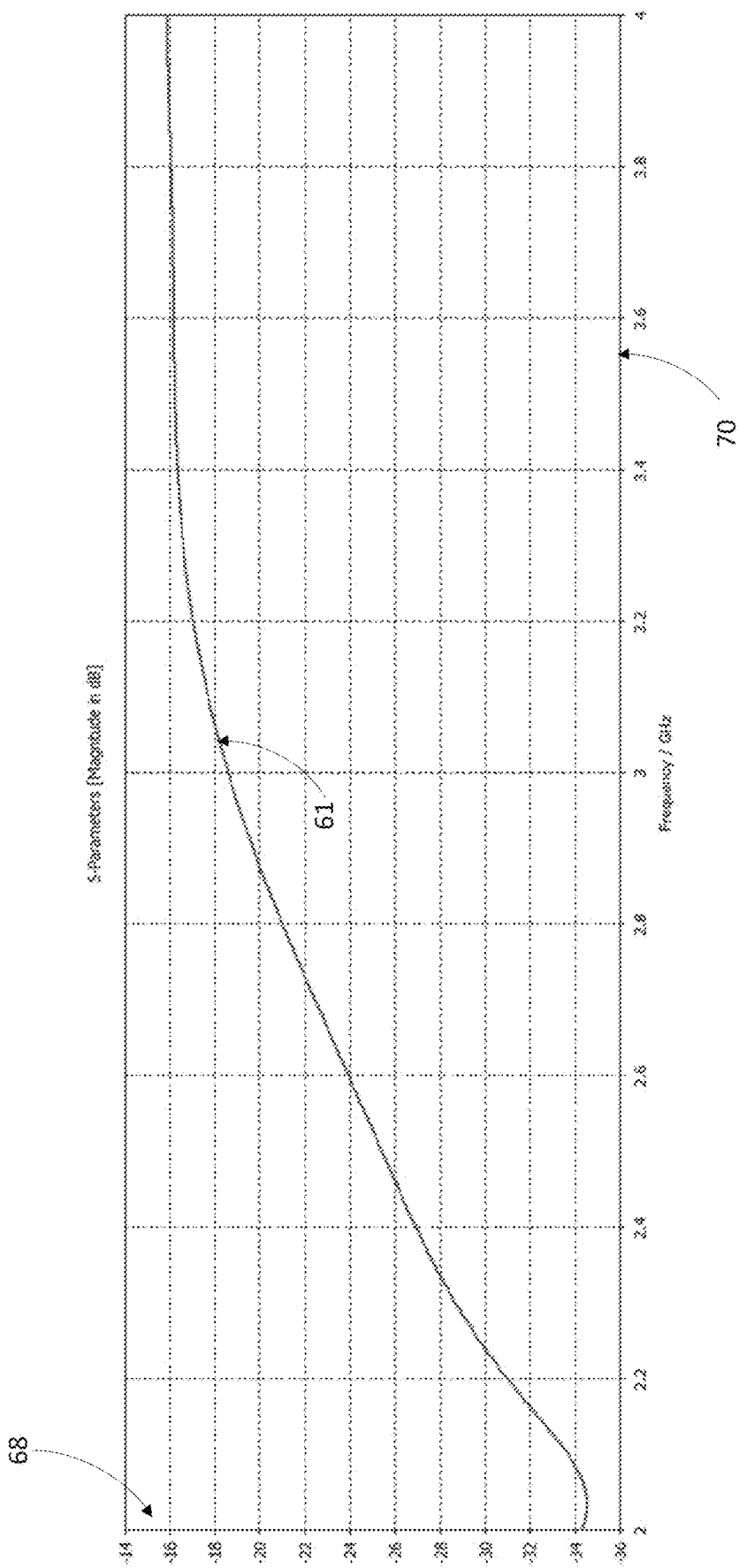
FIG. 5 illustrates an example plot of an S-parameter of an example antenna implemented in accordance with the present disclosure.

FIG. 5 illustrates an example plot of an S-parameter of an example antenna implemented in accordance with the present disclosure. Shown in FIG. 5 is a simulated plot of an S-parameter of an antenna in accordance with the present disclosure, such as the antenna 1 of FIG. 1, over a frequency range from 2 GHz to 4 GHz.

The X-axis 70 of the plot illustrated in FIG. 5 indicates frequency, with the major increments between marks on this X-axis being 0.2 GHz. The Y-axis 68 of the plot indicates the S-parameters magnitude in dB. In this regard, in the context of the present disclosure and/or implementations based in accordance therewith, S-parameters describe the input-output relationship between ports of an electrical system.

The parameter S-12 is indicated on these axes using the line marked with reference numeral 61. In this regard, as shown in FIG. 5, the S-12 parameter is generated by simulation assuming two ideal ports. However, it should be appreciated that in practice the two ports of the antenna may be driven by a coaxial probe or a microstrip probe, the properties of which may alter the parameter S-12 shown in FIG. 5.

The parameter S-12 represents the power transferred from the second signal connection (Port 2) to the first signal connection (Port 1) of the antenna. For example, with reference to FIG. 1, the first signal connection (Port 1) may be provided by the first stem 8 of the annular land 4 together with the first land 10, 10'. Likewise, the second signal connection (Port 2) may be provided by the second stem 9 of the annular land 4 together with the second land 20, 20'.

As shown in FIG. 5, the parameter S-12 rises gradually from about −34 dB at 2 GHz and levels off at around −18 dB at around 3.6 GHz, from where it remains relatively constant until 4 GHz.

Figure 6:
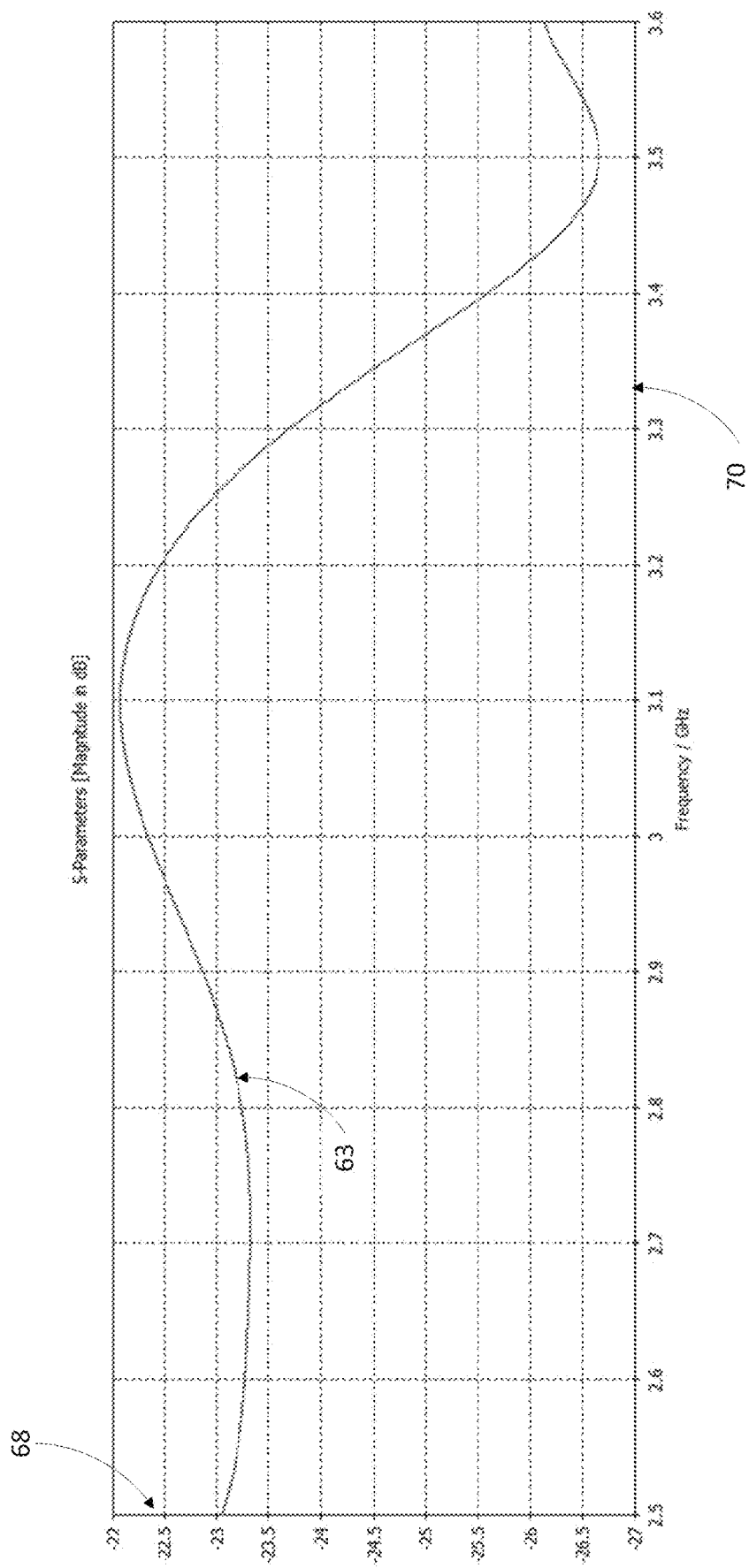
FIG. 6 illustrates a plot of an S-parameter of another example antenna implemented in accordance with the present disclosure.

FIG. 6 illustrates a plot of an S-parameter of another example antenna implemented in accordance with the present disclosure. Shown in FIG. 6 is a simulated plot of an S-parameter of an antenna in accordance with the present disclosure, such as the antenna 1a of FIG. 2A, over a frequency range of 2.5 GHz to 4 GHz.

The X-axis 70 of the plot illustrated in FIG. 6 indicates frequency, with the major increment between marks on this X-axis being 0.1 GHz. The Y-axis 68 of the plot indicates the S-parameters magnitude in dB.

The parameter S-12 is indicated on these axes using the line marked with reference numeral 63. In this regard, as shown in FIG. 6, the S-12 parameter is also generated by simulation assuming two ideal ports. Again, it should be appreciated that in practice the two ports of the antenna may be driven by a coaxial probe or a microstrip probe, the properties of which may alter the parameter S-12 shown in FIG. 6.

The parameter S-12 represents the power transferred from the second signal connection (Port 2) to the first signal connection (Port 1) of the antenna. For example, with reference to FIG. 2a, the first signal connection (Port 1) may be provided by the first stem 8 of the annular land 4a together with the first land 10a, 10a'. Likewise, the second signal connection (Port 2) may be provided by the second stem 9 of the annulus together with the second land 20a, 20a'.

As shown in FIG. 6, the parameter S-12 drops slightly from −23 dB at 2.5 GHz to a local minimum of about −23.3 dB at around 2.7 GHz. It then rises to a maximum of about −22.1 dB at about 3.1 GHz and then drops to a minimum of about −26.6 dB at about 3.5 GHz. It then rises to about −26.1 dB at 3.6 GHz. As may be seen, in comparison to the plot shown in FIG. 5, the inclusion of the stub in the antenna may reduce S-12 above 3 GHz, thereby increasing the isolation of the ports.

Figure 7:
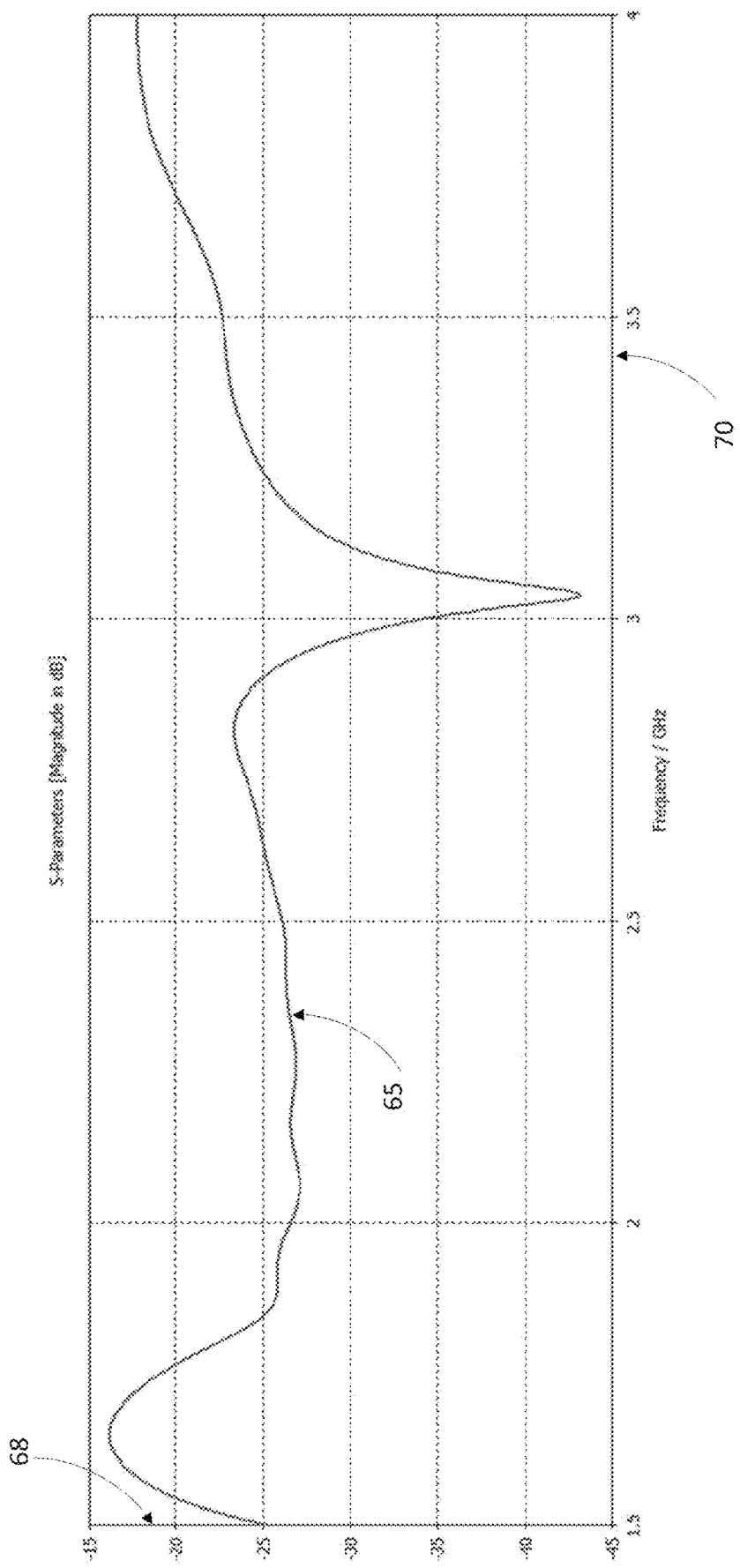
FIG. 7 illustrates a plot of an S-parameter of another example antenna implemented in accordance with the present disclosure.

FIG. 7 illustrates a plot of an S-parameter of another example antenna implemented in accordance with the present disclosure. Shown in FIG. 7 is a simulated plot of an S-parameter of an antenna in accordance with the present disclosure, such as the antenna 1b of FIG. 2B, over a frequency range of 1.5 GHz to 4 GHz.

The X-axis 70 of the plot illustrated in FIG. 7 indicates frequency, with the major increment between marks on this X-axis being 0.5 GHz. The Y-axis 68 of the plot indicates the S-parameters magnitude in dB.

The parameter S-12 is indicated on these axes using the line marked with reference numeral 65. In this regard, as shown in FIG. 7, the S-12 parameter is also generated by simulation assuming two ideal ports. Again, it should be appreciated that in practice the two ports of the antenna may be driven by a coaxial probe or a microstrip probe, the properties of which may alter the parameter S-12 shown in FIG. 7.

The parameter S-12 represents the power transferred from the second signal connection (Port 2) to the first signal connection (Port 1) of the antenna. For example, with reference to FIG. 2B, the first signal connection (Port 1) may be provided by the first stem 8 of the annular land 4b together with the first land 10a, 10a'. Likewise, the second signal connection (Port 2) may be provided by the second stem 9 of the annular land 4b together with the second land 20a, 20a'.

As shown in FIG. 7, the parameter S-12 rises from −25 dB at 1.5 GHz to a local maximum of about −16 dB at around 1.65 GHz. It then drops to around −26 dB at around 1.8 GHz. It then remains relatively constant, with some undulation, in the range 1.8 GHz to 2.5 GHz, where it rises to about −23 dB at about 2.8 GHz. It then drops sharply to a minimum of about −43 dB at around 3.05 GHz, and then rises sharply to about −25 dB at about 3.25 GHz. It then continues to rise less sharply, with some undulation, to about −17.5 dB at 4 GHz. As may be seen, in comparison to the plots shown in FIGS. 5 and 6, the inclusion of the double stub in the antenna may further reduce S-12 above 3 GHz, thereby further increasing the isolation of the ports.

Figure 8:
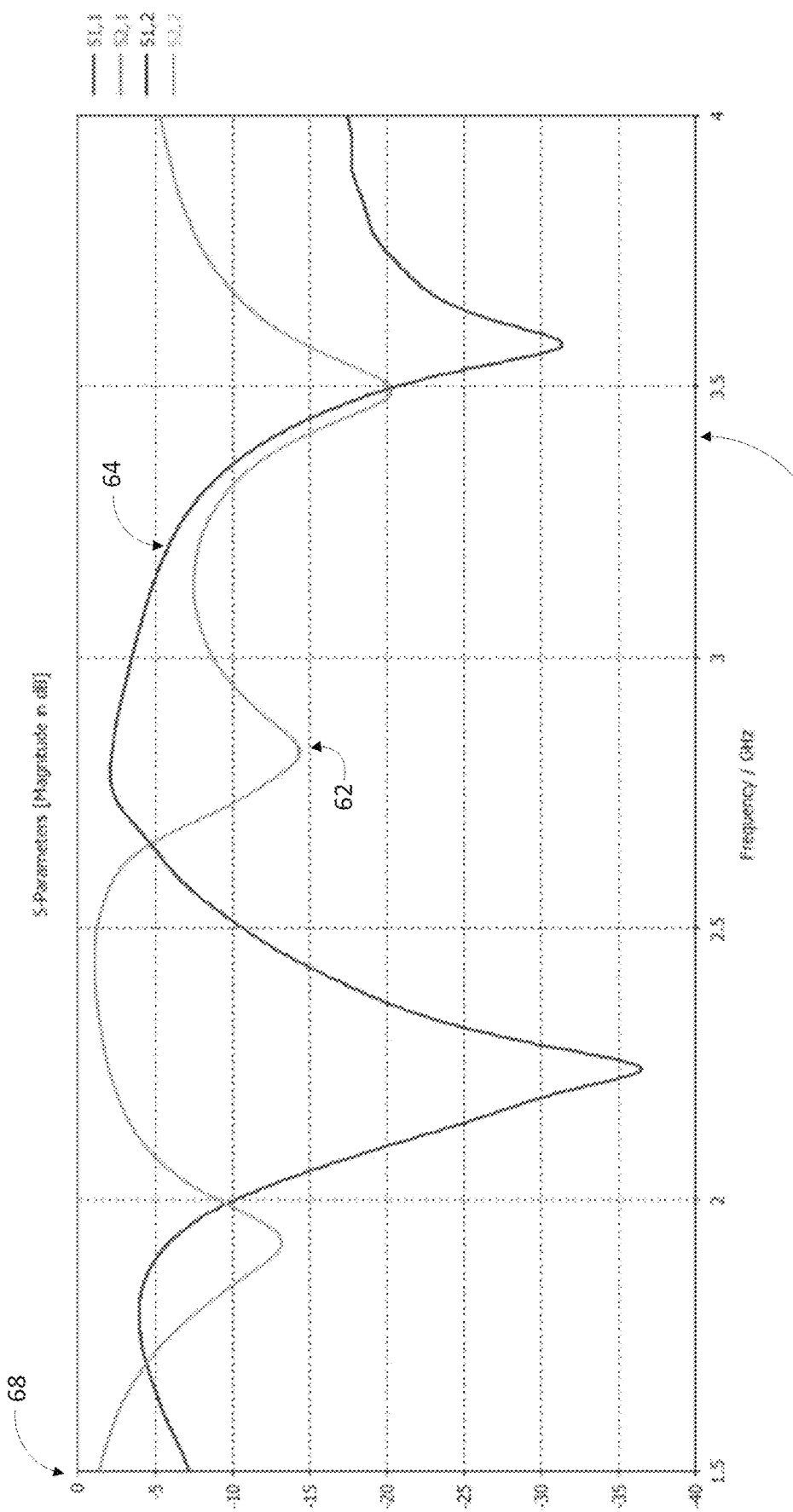
FIG. 8 illustrates a plot of the S-parameters of another example antenna implemented in accordance with the present disclosure.

FIG. 8 illustrates a plot of the S-parameters of another example antenna implemented in accordance with the present disclosure. Shown in FIG. 8 is a simulated plot of an S-parameter of an antenna in accordance with the present disclosure, such as the antenna 1d of FIG. 3, over a frequency range of 1.5 GHz to 4 GHz.

The X-axis 70 of the plot illustrated in FIG. 8 indicates frequency, with the major increment between marks on this X-axis being 0.5 GHz. The Y-axis 68 of the plot indicates the S-parameters magnitude in dB.

The parameter S-22 is indicated on these axes by the line marked with reference numeral 62. The parameter S-12 is indicated on these axes by the line marked with reference numeral 64. In this regard, in contrast to the plots shown in FIGS. 5, 6 and 7, the simulation used to produce the S-parameters shown in FIG. 8 is generated by additionally simulating the properties of a coaxial probe used to drive the ports of the antenna 1*d*.

The parameter S-12 represents the power transferred from the second signal connection (Port 2) to the first signal connection (Port 1) of the antenna. For example, with reference to FIG. 3, the first signal connection (Port 1) may be provided by the first stem 8*d* of the annular land 4*d* together with the first land 10*d*, 10*d'*. Likewise, the second signal connection (Port 2) may be provided by the second stem 9*d* of the annulus together with the second land 20*d*, 20*d'*. The parameter S-22 represents how much power is reflected by the antenna 1*d* at the second signal connection. The S-22 parameter is thus often referred to as the reflection coefficient or return loss of the antenna 1*d*.

It should be appreciated that, as the antenna is symmetrical about the line that bisects the annulus between Port 1 and Port 2, the parameters S-11 and S-21 (not shown) substantially match the profile of parameters s-22 and s-12 respectively.

As shown in FIG. 8, the parameter S-22 drops from about −1 dB to −13 dB in the range from 1.5 GHz to about 1.9 GHz. It then rises to about −2 dB at about 2.2 GHz where it remains relatively constant before falling from about 2.6 GHz to a local minimum of about −14 dB at about 2.8 GHz. It then rises to a local maximum of about −7 dB at about 3.2 GHz before falling to a local minimum of about −20 dB at around 3.5 GHz. It then rises sharply but levels off at around −5 dB at 4 GHz.

As shown in FIG. 8, the parameter S-12 rises from about −7 dB at 1.5 GHz to a local maximum of about −4 dB at about 1.8 GHz. It then drops sharply down to about −37 dB at about 2.2 GHz before rising sharply again to about −2 dB at 2.8 GHz. It then drops gradually to about −7 dB at around 3.3 GHz, and then sharply to a local minima of about −31 dB at around 3.6 GHz. It then rises sharply but levels off at around −17 dB at 4 GHz.

FIGS. 5 to 8 illustrate one example each of antenna performance that may be achieved for their respective antennas in accordance with the present disclosure.

While antennas are described with respect to various implementations as laying on the surface of a substrate, the disclosure is not so limited, and as such, in some implementations the antennas may be operated in free space. Further, while in the implementations described above the stub is provided either inside the annulus, or (both) inside and outside the annulus, the disclosure is not so limited, and as such in some example implementations, the stub may only be positioned outside of the annulus. For example, the stub may extend radially outwards from the annulus, from a first end connected to annulus to a second end outside the annulus.

In some example implementations, the stub may be positioned on the other side of the annulus to the example implementations, described above. For example, the stub may be positioned at a point on the annulus equidistant between the first stem and the second stem, such that the angle between the stub and both the first and second stems is approximately 135°.

In some example implementations, the stub may not extend from a point on the annulus that is equidistant between the first and second stems, such that the stub is closer to one of the stems than the other.

It should be understood that various aspects or characteristics associated with the antennas described above are non-limiting. For example, the lengths of the stubs described and shown are only exemplary, and that the length of the stub into and out from the annulus may vary in different example implementations. For example, the length of the stub extending towards the center of the annulus may differ from the length of the stub extending outwards from the annulus.

Similarly, the position of the protuberances on the stub shown in FIG. 3 is merely exemplary. As such, in some instances, the protuberances may extend from other points on the stub, for example points on the first part of the stub outside of the annulus. The protuberances may also be of shapes other than rectangular in other example implementations. In addition, in some example implementations, the stub may only comprises 1 protuberance. Further, in other example implementations, the stub may comprise greater than two protuberances.

Similarly, the circular element on the stub shown in FIG. 2C is merely exemplary. In this regard, the element may be of other shapes, e.g., oval-shaped or rectangular. In some example implementations, a circular or other shaped element may be provided on the stub outside of the annulus. For example, where an end of the stub is outside of the annulus, such as the example shown in FIG. 2B, the element may be provided at that end. In some example implementations, more than one such element may be provided on a stub.

In some example implementations, the antenna may have more than one stub, which may further decouple the two ports. For example, the stubs may be spaced evenly around the circumference of the annulus such that the symmetry of the antenna is maintained.

In some example implementations, the two ports may be driven at different frequencies to one another. In such implementations, the antenna may act as a wideband antenna rather than a MIMO antenna. One set of frequencies may be radiated through one port and another set of frequencies may be radiated through the other port, at orthogonal polarizations to one another. Retuning of the antenna, e.g., adjusting the dimension of the antenna, may be required based on the coupling between the two ports. In such instances, the lengths of the first land and the second land may differ from one another, for example to account for the different frequencies applied to the first and second ports.

It should be appreciated from the discussion above that the embodiments shown in the figures are merely exemplary, and include features that may be generalized, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments, the function of one or more elements shown in the drawings may be integrated into a single functional unit.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. An antenna comprising:
   a planar dielectric substrate;
   a conductive annulus on a first surface of the substrate;
   a first conductive land on the first surface, wherein the first conductive land is outside the conductive annulus and wherein an edge of the first conductive land adjacent to an outward edge of a first portion of the conductive annulus is spaced from the outward edge of the first portion of the conductive annulus to provide a first slot therebetween; and
   a second conductive land on the first surface wherein the second conductive land is outside the conductive annulus and wherein an edge of the second conductive land adjacent to the outward edge of a second portion of the conductive annulus is spaced from the outward edge of the second portion of the conductive annulus to provide a second slot therebetween.

2. The antenna of claim 1, further comprising a stub on the first surface and connected to the conductive annulus.

3. The antenna of claim 2, wherein the stub comprises at least one of: a first part connected to, and protruding radially outward from, an outward edge of the conductive annulus; and a second part connected to, and protruding radially inwards from, an inward edge of the conductive annulus.

4. The antenna of claim 1, wherein the first conductive land comprises a first arc shaped land.

5. The antenna of claim 4 further comprising a first stem disposed on the first surface and connected to an outward edge of the conductive annulus.

6. The antenna of claim 5, wherein at least one edge of the first stem lies adjacent to and parallel to an edge of the first conductive land.

7. The antenna of claim 6, wherein the first conductive land comprises a first part and a second part separated from the first part by the first stem.

8. The antenna of claim 4, wherein the second conductive land comprises a second arc shaped land.

9. The antenna of claim 5, comprising a second stem disposed on the first surface and connected to the outward edge of the conductive annulus, wherein at least one edge of the second stem lies adjacent to and parallel to an edge of the second conductive land.

10. The antenna of claim 9, wherein the second conductive land comprises a first part and a second part separated from the first part by the second stem.

11. The antenna of claim 9, wherein the first stem and the second stem are separated about a circumference of the conductive annulus by an angular separation of 90°.

12. The antenna of claim 2, wherein the stub is connected to the conductive annulus between the first portion and the second portion.

13. The antenna of claim 2, wherein the stub comprises at least one protuberance on the surface connected to and transverse to the stub.

14. The antenna of claim 9, wherein at least one of the first stem and the second stem comprises a tapered portion arranged so that a spacing between the stem and an adjacent conductive land gets wider towards the conductive annulus.

15. The antenna of claim 9 comprising a first signal connection connected to the first conductive land, and a second signal connection connected to the second stem, wherein the first stem is grounded and the second conductive land is grounded.

16. A transceiver apparatus comprising:
   an antenna comprising:
   a planar dielectric substrate;
   a conductive annulus on a first surface of the substrate;
   a first conductive land on the first surface, wherein the first conductive land is outside the conductive annulus and wherein an edge of the first conductive land adjacent to an outward edge of a first portion of the conductive annulus is spaced from the outward edge of the first portion of the conductive annulus to provide a first slot therebetween;
   a second conductive land on the first surface wherein the second conductive land is outside the conductive annulus and wherein an edge of the second conductive land adjacent to the outward edge of a second portion of the conductive annulus is spaced from the outward edge of the second portion of the conductive annulus to provide a second slot therebetween; the transceiver apparatus further comprising a first transmit/receive apparatus connected to the first conductive land for exciting the first slot; and
   a second transmit/receive apparatus connected to the conductive annulus for exciting the second slot;
   wherein the first transmit/receive apparatus is configured to provide a first input/output channel, and the second transmit/receive apparatus is configured to provide second input/output channel.

17. The apparatus of claim 16, wherein the antenna comprises a first stem disposed on the first surface and connected to the outward edge of the conductive annulus, and a second stem disposed on the first surface and connected to the outward edge of the conductive annulus, and the second transmit/receive apparatus is connected to the conductive annulus by the second stem, and the first stem is grounded.

18. A method of operating an antenna, wherein the antenna comprises a first port, and a second port; the method comprising:

providing a first input/output channel in a first frequency range at the first port using a first polarization mode of the antenna;

providing a second input/output channel in a second frequency range at the second port using a second polarization mode of the antenna; and wherein the first polarization mode is orthogonal to the second polarization mode.

19. The method of claim 18, wherein:

providing a first input/output channel comprises at least one of receiving and transmitting a signal in the first frequency range; and providing a second input output channel comprises at least one of receiving and transmitting a signal in the second frequency range.

20. The method of claim 18, wherein the antenna comprises:

a planar dielectric substrate;

a conductive annulus on a first surface of the substrate;

a first conductive land on the first surface, wherein the first conductive land is outside the conductive annulus and wherein an edge of the first conductive land adjacent to the outward edge of a first portion of the conductive annulus is spaced from the outward edge of the conductive annulus to provide the first slot therebetween; and a second conductive land on the first surface wherein the second conductive land is outside the conductive annulus and wherein an edge of the second conductive land adjacent to the outward edge of a second portion of the conductive annulus is spaced from the outward edge of the conductive annulus to provide the second slot therebetween.

\* \* \* \* \*